(12) United States Patent
Baba et al.

(10) Patent No.: US 7,268,459 B2
(45) Date of Patent: Sep. 11, 2007

(54) ELECTRIC POWER STEERING APPARATUS

(75) Inventors: Takashi Baba, Maebashi (JP); Manabu Okamura, Maebashi (JP); Sachio Nakayama, Maebashi (JP)

(73) Assignee: NSK Ltd., Tokyo (JP)

( * ) Notice: Subject to any disclaimer, the term of this patent is extended or adjusted under 35 U.S.C. 154(b) by 181 days.

(21) Appl. No.: 11/181,282

(22) Filed: Jul. 13, 2005

(65) Prior Publication Data
US 2006/0012262 A1    Jan. 19, 2006

(30) Foreign Application Priority Data
Jul. 13, 2004    (JP) .............................. 2004-206191

(51) Int. Cl.
*H02K 1/04* (2006.01)
*H02K 1/06* (2006.01)
*H02K 15/00* (2006.01)

(52) U.S. Cl. ...................................... 310/216; 310/259

(58) Field of Classification Search ........ 310/216–218, 310/254, 258, 259, 45
See application file for complete search history.

(56) References Cited

U.S. PATENT DOCUMENTS

| | | | |
|---|---|---|---|
| 3,873,861 A | | 3/1975 | Halm |
| 6,472,780 B2* | | 10/2002 | Kikuchi et al. ................ 310/52 |
| 6,822,364 B2* | | 11/2004 | Suzuki et al. ................ 310/218 |
| 6,836,051 B2* | | 12/2004 | Hiwaki et al. ............... 310/258 |
| 2002/0047473 A1* | | 4/2002 | Laurent et al. ............. 310/254 |
| 2002/0139606 A1* | | 10/2002 | Williams et al. ............ 180/446 |
| 2004/0021393 A1 | | 2/2004 | Suzuki et al. |
| 2004/0070304 A1 | | 4/2004 | Enomoto et al. |

FOREIGN PATENT DOCUMENTS

| | | |
|---|---|---|
| EP | 571155 A1 * | 11/1993 |
| EP | 0 874 444 A1 | 10/1998 |
| EP | 1 384 893 A2 | 1/2004 |
| EP | 1 501 170 A1 | 1/2005 |
| JP | 62-110468 A | 5/1987 |
| JP | 01-138936 A | 5/1989 |
| JP | 08-265995 A | 10/1996 |
| JP | 09-275669 A | 10/1997 |
| JP | 11-089195 A | 3/1999 |
| JP | 2001-275325 A | 10/2001 |
| JP | 2002-027688 A | 1/2002 |
| JP | 2003-250254 A | 9/2003 |

* cited by examiner

*Primary Examiner*—Tran Nguyen
(74) *Attorney, Agent, or Firm*—Drinker Biddle & Reath LLP

(57) ABSTRACT

The electric power steering apparatus includes a brushless motor as an electric motor. The motor has a rotor and a stator 34. The stator 34 includes: a back core BY; a plurality of teeth TS disposed along the circumference of the back core protruding from the back core BY toward its radial center and forming slots SL therebetween; and an exciting coil 38 wound around each of the teeth TS. Each of the slots SL is filled with a resin material. The back core BY is partially press-fitted into a yoke 21 so that the outer surface of the back core BY comes partially into contact with the inner surface of the yoke 21 along their circumferences.

4 Claims, 5 Drawing Sheets

ENLARGEMENT OF PORTION A

ENLARGEMENT OF PORTION A IN FIG.3

ELECTRIC POWER STEERING APPARATUS

CROSS-REFERENCE TO RELATED APPLICATION

This application relates to and claims priority from Japanese Patent Application No. 2004-206191, filed on Jul. 13, 2004, the entire disclosure of which is incorporated herein by reference.

BACKGROUND

1. Field of the Invention

The present invention relates to an electric power steering (EPS) apparatus for vehicles that uses an electric motor to assist the manual steering force applied by a driver. More particularly, this invention relates to an electric power steering apparatus with a function reducing vibration and noise.

2. Description of Related Art

Lately, almost all vehicles are equipped with a power steering apparatus that assists the steering force applied by a driver.

As one example of such a power steering apparatus, an electric power steering (EPS) apparatus is known. The known electric power steering apparatus includes, for example, a torque sensor for detecting steering torque applied to wheels, and an electric motor for steering assistance, and is structured to drive the electric motor in response to the steering torque detected by the torque sensor. Rotational output of the electric motor serves as steering-assist torque, and is decelerated by a gear mechanism and then transmitted to the output shaft of the steering mechanism. Accordingly, the transmitted rotational output assists the steering force applied to the steering wheel, thereby steering the vehicle.

Conventionally, brush motors were mainly used as the electric motors for the above-described conventional electric power steering apparatus. However, with the enhancement of reliability and further improvement in efficiency, the use of brushless motors has increased, and the demand for high-powered brushless motors is growing.

Since the electric motor is positioned close to the steering wheel in cases where a column-type electric power steering apparatus has an electric drive motor attached to the steering column section, it is necessary to suppress and reduce noise and vibration caused by the electric motor.

Meanwhile, there is also the demand for suppression of torque loss fluctuation in the above-described electric motor. Torque loss means loss of an electric motor's output torque caused by friction arising from the motor structure, and other electromagnetic factors. Torque loss adds unintended force or opposite-direction force to steering direction even in the case of slight steering during straight-ahead driving, and degrades the steering sensation.

Particularly when torque loss fluctuation is large, the fluctuation turns into physical vibration, which is then transmitted to the steering wheel, causing cogging. Such cogging brings a bad or uncomfortable feeling to a driver, and thus it is necessary that an electric motor used for an electric power steering apparatus generates small torque loss fluctuation.

As described in Japanese Patent Laid-Open (Kokai) Publications No. SHO62-110468 and No. 2001-275325, there is a known method for reducing torque loss fluctuation by adjusting the combination of the number of stator salient poles with the number of rotor magnetic poles. Furthermore, as described in Japanese Patent Laid-Open (Kokai) Publication No. 2003-250254, an electric power steering apparatus having an electric motor where the torque loss fluctuation is reduced by the above-described method is also known.

SUMMARY

However, as for conventional column-type electric power steering apparatuses, there is demand for further enhancement of the resistance to vibration and noise caused by torque loss fluctuation. Since, with a column-type electric power steering apparatus, an electric motor is located at a position close to the driver, vibration and noise caused by the electric motor's torque loss fluctuation are easily transmitted to the driver (or passengers). So, sufficient quietness has not yet been achieved.

Accordingly, the present invention has been made considering the above-described problem peculiar to an electric power steering apparatus, i.e., cogging of a brushless motor that causes discomfort in a driver from the vibration and noise. In particular, it is an object of the present invention to provide an electric power steering apparatus that can achieve a high level of quietness by employing, as a stator's mechanical structure, a structure that can improve anti-vibration and anti-noise properties, and thereby suppress the occurrence of cogging due to torque loss fluctuation of an electric motor and reduce or suppress transmission of vibration and noise due to the cogging torque.

In order to achieve the above-described object, the present invention provides an electric power steering apparatus for making an electric motor generate a steering-assist torque in response to a steering torque applied to wheels. The electric motor includes: a rotor rotating around an axis of the electric motor; and a stator disposed facing the rotor with a certain distance between them in a radial direction of the electric motor. The stator includes: a back core of approximately cylindrical shape in the axial direction of the electric motor; a plurality of teeth disposed along the circumference of the back core protruding from the back core toward its radial center and forming slots therebetween; and an exciting coil wound around each of the plurality of teeth. This apparatus is characterized in that each of the slots is filled with a resin material after the coil is wound around each of the teeth.

Concerning the above-described structure, it is preferable that the electric power steering apparatus further includes a yoke disposed around and in contact with the outer surface of the back core and formed in an approximately cylindrical shape along the axial direction, wherein the back core is partially press-fitted into the yoke so that the outer surface of the back core comes partially into contact with the inner surface of the yoke along their circumferences.

Furthermore, this invention provides an electric power steering apparatus for making an electric motor generate a steering-assist torque in response to a steering torque applied to wheels. The electric motor includes: a rotor rotating around an axis of the electric motor; a stator disposed facing the rotor with a certain distance between them in a radial direction of the electric motor; and a yoke of approximately cylindrical shape disposed around the stator. The stator includes: a back core of approximately cylindrical shape in the axial direction of the electric motor; a plurality of teeth disposed along the circumference of the back core protruding from the back core toward its radial center and forming slots therebetween; and an exciting coil wound around each of the plurality of teeth. This apparatus is characterized in that the back core is partially press-fitted into the yoke so that the outer surface of the back core comes partially into contact with the inner surface of the yoke along their circumferences.

The present invention employs a resin-filled portion formed by filling the slots with a resin material after winding the coil around the plurality of stator teeth, and/or a partially press-fitted configuration between the back core and the yoke. Consequently, the resin-filled portion functions as a means for improving stator's rigidity, blocking vibration, and the like, while the partially press-fitted configuration functions to prevent the deterioration of the magnetic property of the stator material and to reduce the number of transmission paths for vibration and noise. Accordingly, it is possible to provide an electric power steering apparatus that can achieve a high level of quietness by employing, as a stator's mechanical structure, a structure that can improve anti-vibration and anti-noise properties, and thereby suppress the occurrence of cogging due to torque loss fluctuation of the electric motor and reduce or suppress transmission of vibration and noise due to such cogging torque.

DETAILED DESCRIPTION

With reference to FIGS. 1 through 6, an electric power steering apparatus according to one embodiment of this invention is explained below.

Figure 1:
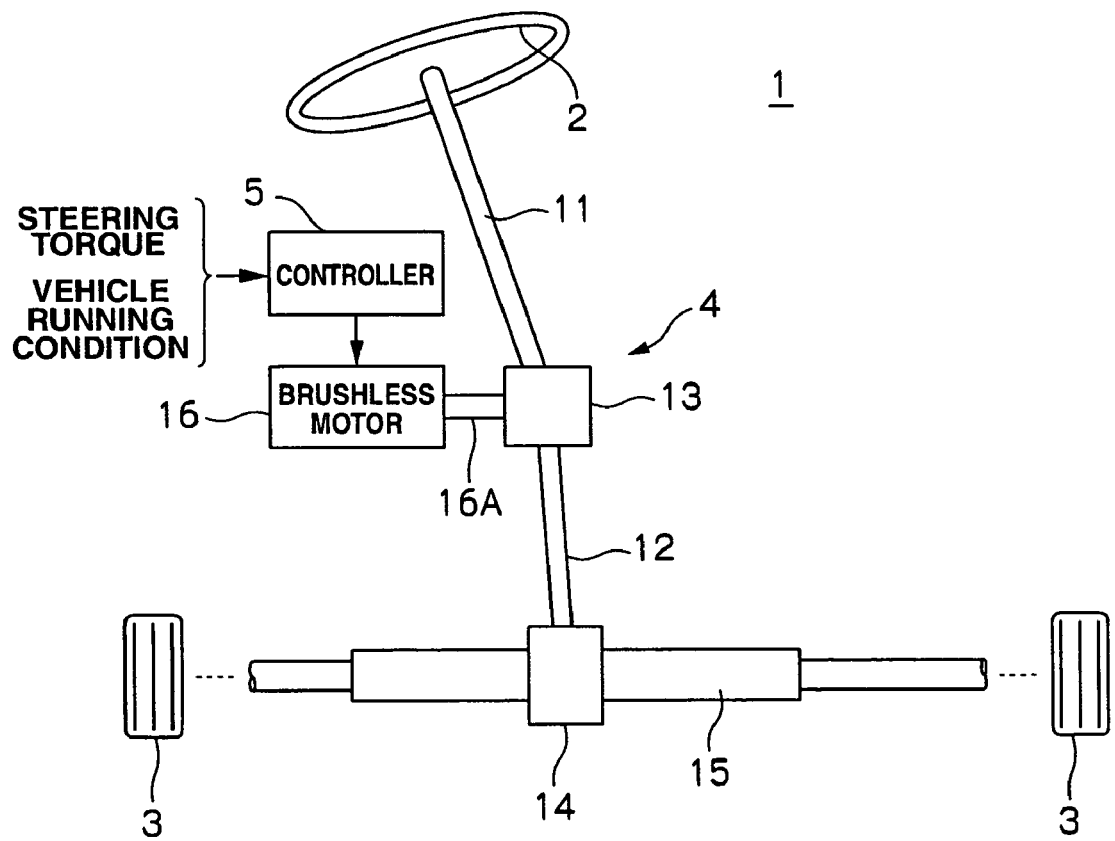
FIG. 1 is an explanatory diagram that illustrates the schematic configuration of the electric power steering apparatus according to one embodiment of the present invention.

As shown in FIG. 1, this electric power steering apparatus has a steering mechanism 4 interposed between a steering wheel 2 and wheels 3, and a controller 5 for controlling the generation of a steering force by the steering mechanism 4.

The steering mechanism 4 has: a column shaft 11 joined to the steering wheel 2; an intermediate shaft 12; a worm gear 13 interposed between the column shaft 11 and the intermediate shaft 12; and a gear 14 and a rack 15 joined between the intermediate shaft 12 and the wheels 3. Furthermore, the worm gear 13 engages with an output shaft 16A of a brushless motor 16 that is an electric motor. The brushless motor 16 is activated to rotate in response to a signal (activating current) by the controller 5, and gives a steering-assist force to the steering mechanism 4.

The steering force applied to the steering wheel 2 is transmitted through the column shaft 11 to the worm gear 13. The worm gear 13 includes a deceleration mechanism not shown in the drawing. Although not shown in the drawing, the worm gear 13 changes the rotation direction of the output from the brushless motor 16's output shaft 16A to a direction perpendicular to that rotating direction, and the worm gear performs deceleration and generates an assist-torque. The assist-torque is added to a steering torque and then transmitted to the intermediate shaft 12. The assist-torque from the brushless motor 16 is given to the wheels 3, and the steering-assist force is obtained from the brushless motor 16.

The controller 5 receives a signal from a torque sensor (not shown) that detects steering force, as well as information indicating the running condition of the vehicle, such as steering angle and vehicle speed, calculates a necessary steering-assist force based on that information at evenly spaced time intervals, and provides the brushless motor 16 with an activating current to generate a rotating direction and rotational torque corresponding to the calculated steering-assist force. Accordingly, a driver's manual steering force applied to the steering wheel 2 is assisted in terms of torque, and the assisted steering force is transmitted to the wheels 3, whereby an electric power steering function is achieved.

Figure 2:
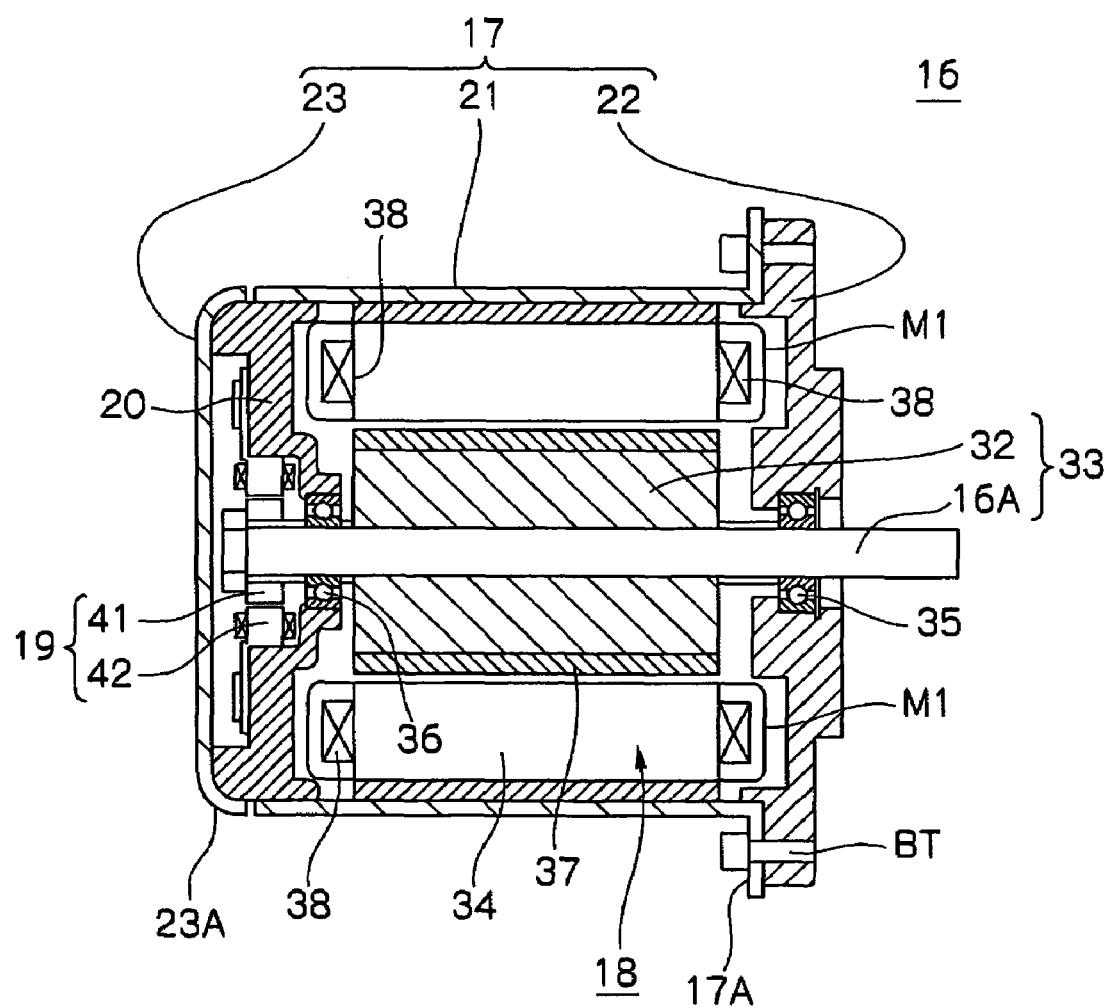
FIG. 2 is an axial sectional view illustrating the structure of a brushless motor as an electric motor mounted on the electric power steering apparatus according to the embodiment.

FIG. 2 is an axial sectional view of the brushless motor 16. This brushless motor 16 has: a motor cover 17 formed in its entirety in an approximately cylindrical shape; a motor unit 18 disposed inside the motor cover 17 to generate a rotational torque; a resolver 19 disposed inside the motor cover 17 coaxially with the motor unit 18 to detect the rotation position of a rotor of the motor unit 18; and a resolver supporting member 20 for supporting the resolver 19 within the motor cover 17.

As can be seen from FIG. 2, the motor cover 17 has: a motor yoke 21 formed in its entirety in a cylindrical shape of a specified diameter and length; and a front flange 22 and a rear cover 23 which are positioned at the ends of the motor yoke 21. In other words, the motor cover 17 has a three-part structure consisting of the motor yoke 21, the front flange 22, and the rear cover. The axial direction of the motor cover 17 corresponds to the axial direction of the brushless motor 16 and so is hereinafter simply referred to as the "axial direction."

The motor yoke 21 has a flange 17A at its one end (located closer to the deceleration mechanism), and the flange 17A is integrally formed with the motor yoke 21 and is bent outwardly in the direction perpendicular to the axial direction. The front flange 22 is secured to the flange 17A with bolts BT. Accordingly, the opening of the motor yoke 21 at one end thereof is closed by the front flange 22. The front flange 22 is fixed to a gear housing, which is an element of the electric power steering apparatus, with a fixing means (not shown), such as bolts. A receptacle for a rolling bearing is formed at the radial center of the front flange 22.

The opening of the motor yoke 21 at the other end (the end at the rear side) is, as shown in FIG. 2, closed by the resolver supporting member 20 that supports the resolver 19. The rear cover 23 is mounted onto the resolver supporting member 20 to cover the rear side surface of the resolver supporting member 20. A receptacle for the rolling bearing is formed at the radial center of the resolver supporting member 20.

The motor unit 18 includes: a motor rotor (or rotor) 33 with a rotatable motor output shaft 16A and a cylindrical rotor core 32; and a motor stator (or stator) 34. The rotor core 32 is installed securely around the motor output shaft 16A so that the motor output shaft 16A passes through the rotor core 32 along its axial direction, and the rotor core 32 rotates integrally with the motor output shaft 16A. The motor stator 34 is installed securely on the inner surface of the motor yoke 21, and positioned facing the rotor core 32 with a certain space between them. The motor output shaft 16A is rotatably supported with the rolling bearings 35 and 36 installed securely in the above-described respective receptacles formed at the respective centers of the front flange 22 and the resolver supporting member 20. Accordingly, the motor output shaft 16A, that is, the motor rotor 33 is rotatable against the motor stator 34.

A permanent magnet (or motor magnet) 37 for rotary drive is attached to the radial outer surface of the rotor core 32.

Figure 3:
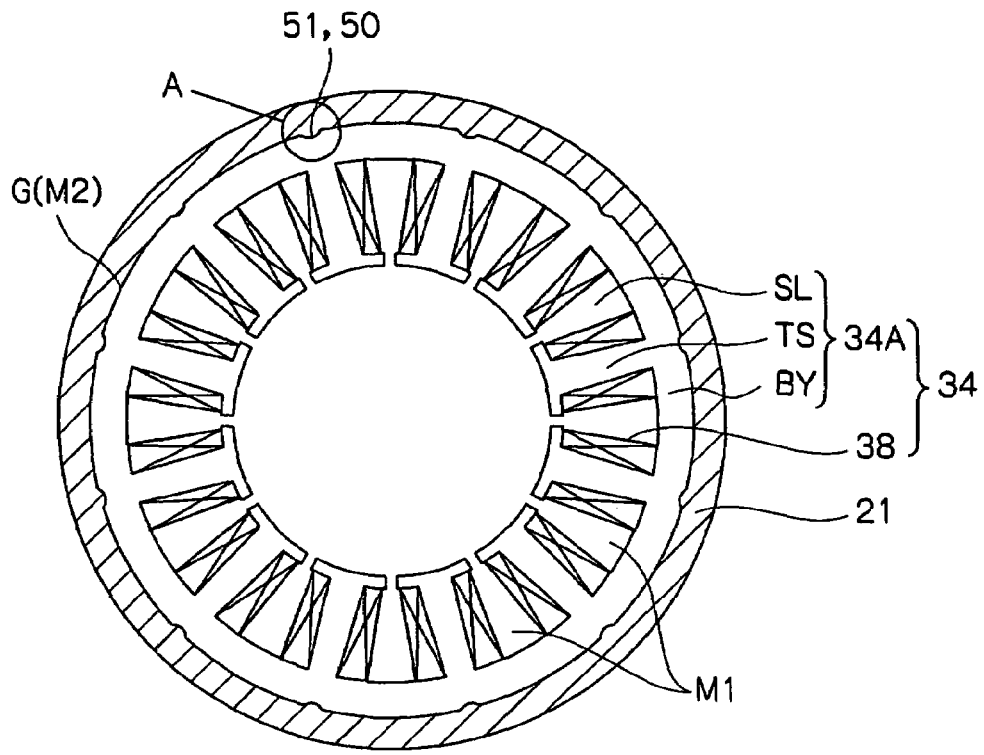
FIG. 3 is a perspective view illustrating the structure of the stator core and the motor yoke of the brushless motor.

As shown in FIG. 3, the motor stator 34 has a stator core 34A. The stator core 34A is pressed in and disposed within the motor yoke 21 (yoke) by a partial press-fit method, as explained in detail later.

The stator core 34A includes: a back core BY formed in an approximately cylindrical shape; and a plurality of teeth TS that protrude from the back core BY toward the radial center of the back core BY, and are configured to form slots SL for coil winding between the adjacent teeth TS. The motor stator 34 is formed by winding a coil (motor coil) 38, using the slots SL (see FIG. 2). In order to reduce eddy-current loss, the back core BY and the plurality of teeth TS have a structure of laminated plates made, for example, by blanking a thin electromagnetic steel plate, into an integrated shape.

Furthermore, after the coils 38 are wound, the plurality of slots SL are molded with an insulating resin material, as shown in FIGS. 2 and 3. Therefore, the resin-filled portions M1 not only fill up the area of the slots SL, but also function as rigid portions integrated with the back core BY, the plurality of teeth TS and the plurality of coils 38.

The resin-filled portions M1 are made by, for example, injecting a resin material after fitting the stator core 34A into the motor yoke 21 by the partial press-fit method (explained later).

Now, the partially press-fitted configuration of the stator core 34A into the motor yoke 21 is explained. The "partially press-fitted (configuration)" as referred to in this embodiment means the state (or configuration) where the stator core 34A is press-fitted into the interior of the motor yoke 21 causing the outer surface of the stator core 34A to come partially into contact with the inner surface of the motor yoke 21. This differs from a conventional configuration where a stator core 34A is press-fitted into the interior of a motor yoke 21 causing the outer surface of the stator core 34A to come totally into contact with the inner surface the motor yoke 21, i.e., a "totally press-fitted (configuration)." Moreover, in the "partially press-fitted" (configuration) of this embodiment, the positions of the partial contact between the outer surface of the stator core 34A and the inner surface of the motor yoke 21 are limited to the plurality of positions corresponding to the plurality of teeth TS evenly spaced and protrusively disposed along the circumferential direction of the stator core 34A.

Figure 4:
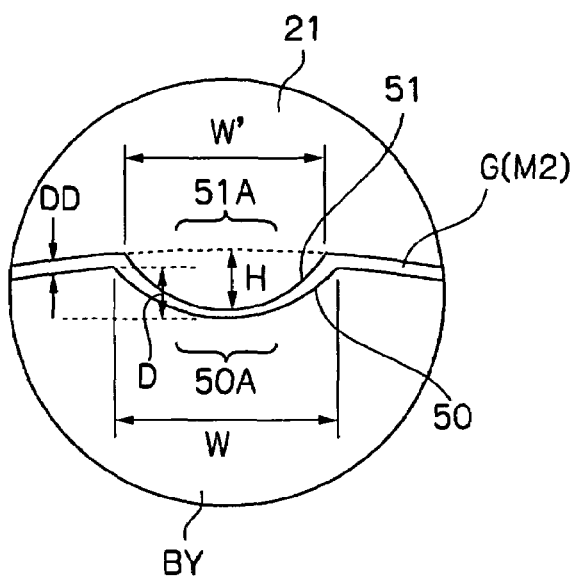
FIG. 4 is a partially enlarged sectional view that shows the partially press-fitted configuration between the stator core and the motor yoke.

The "partially press-fitted" (configuration) is explained referring to FIGS. 3 and 4. On the outer surface of the back core BY of the stator core 34A, concave grooves 50 with a circumferential cross-section of a circular-arc shape are formed at evenly spaced positions along the circumference of the back core BY, on the opposite side of and corresponding to the positions of the plurality of the teeth TS so that the concave grooves 50 extend along, for example, the full length of the stator core 34A in its axial direction. The circumferential width of each concave groove 50 is limited to a width smaller than that of each tooth TS. A bottom portion 50A of each concave groove 50 constitutes a partial contact area of the stator core 34A with the motor yoke 21 in the partial press-fit process. Therefore, the shape and size of each concave groove 50 (depth D and circumferential width W) are determined based on design specifications, including how deep the bottom portion 50A should be made.

On the other hand, on the inner surface of the motor yoke 21, projections 51 with a circumferential cross-section of a circular-arc shape are formed at evenly spaced positions along the circumference of the motor yoke 21 so that the projections 51 extend along, for example, the full length of the motor yoke 21 in its core axial direction. The plural projections 51 are respectively positioned opposite the plural concave grooves 50 on the outer surface of the stator core 34A when the stator core 34A is press-fitted into the motor yoke 21. Furthermore, the following relationship is established concerning the height H and the circumferential width W' of each projection 51, and the depth D and the circumferential width W of each concave groove 50: H=D and W'<W. Moreover, the projections 51 are formed into a circular arc shape so that the respective top portions 51A of the projections 51 can come into contact with the respective bottom portions 50A of the grooves 50.

In addition, the outside diameter of the stator core 34A (excluding the areas of the concave grooves 50) is set to be smaller than the inside diameter of the motor yoke 21 (excluding the areas of the projections 51) by $\Delta D$ (see FIG. 4).

Accordingly, when assembling the brushless motor 16, the plural concave grooves 50 of the stator core 34A are aligned with the plural projections 51 of the motor yoke 21, and in this state, the stator core 34A is press-fitted into the inner surface of the motor yoke 21. Accordingly, the stator core 34A is securely placed inside the motor yoke 21 in a state where only the respective bottom portions 50A of the plural concave grooves 50 formed on the stator core 34A are in contact with the respective top portions 51A of the plural projections 51 formed on the motor yoke 21. Consequently, the partially press-fitted configuration of the stator core 34A and the motor yoke 21 is obtained.

When the partially press-fitted configuration is completed, as can be seen from FIG. 4, there is a gap (or space) G with depth $\Delta D$ between the stator core 34A and the motor yoke 21 along their circumference excluding the contact portions between the bottom portions 50A of the plural concave grooves 50 and the top portions 51A of the plural projections 51. The depth of the gap G is less than $\Delta D$ in the areas where the concave grooves 50 and the projections 51 are placed opposite to each other, and the gap G is formed continuously in the circumferential direction. Therefore, the gap G is filled with a resin material after the press-fit process. In other words, the resin-filled portion M2 extends through the whole circumferential area between the stator core 34A and the motor yoke 21, excluding the contact portions (50A, 51A) of the concave grooves 50 and the projections 51.

Figure 5:
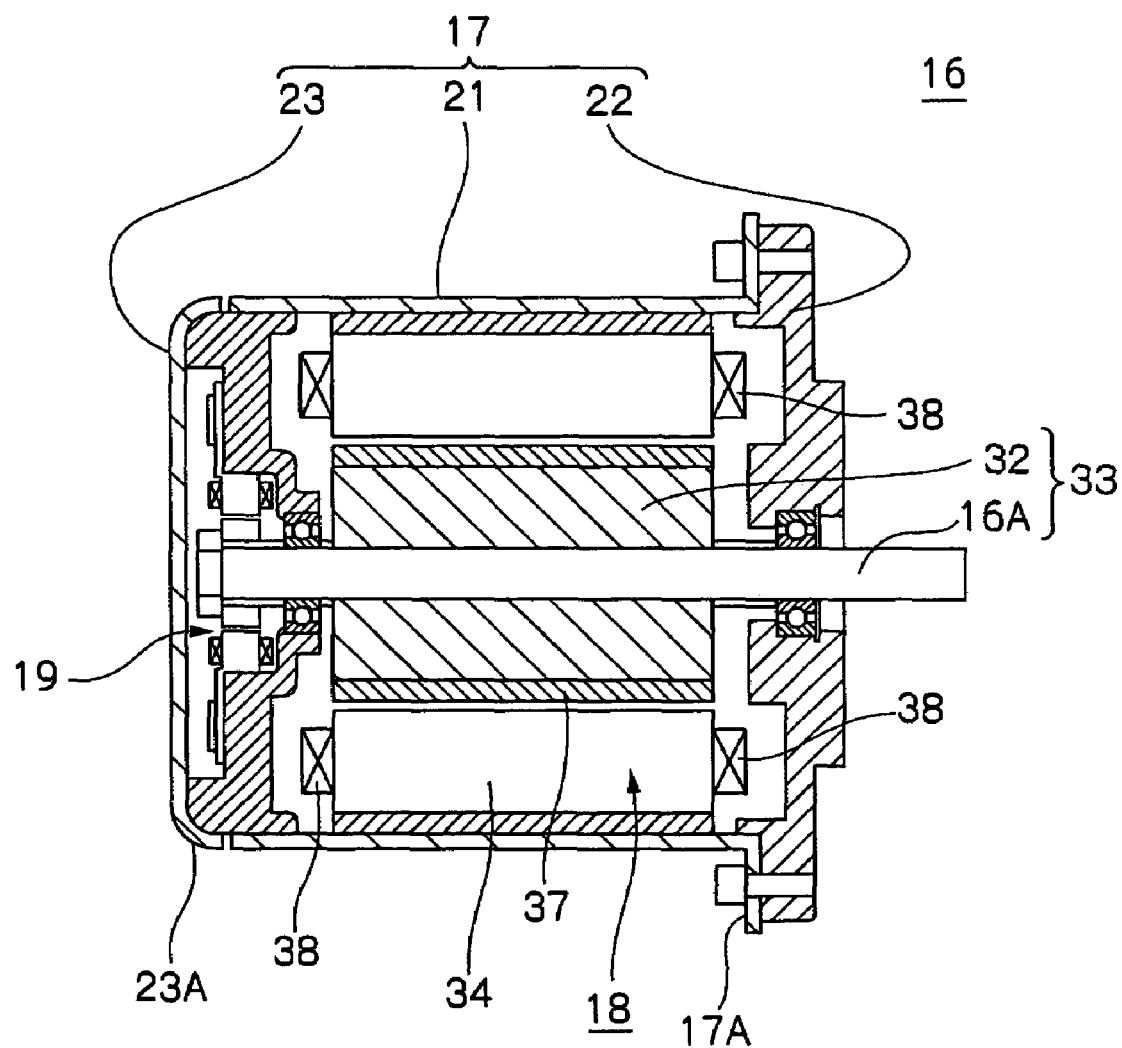
FIG. 5 is an axial sectional view of one example of a conventional brushless motor, in comparison with the motor structure shown in FIG. 2.
Figure 6:
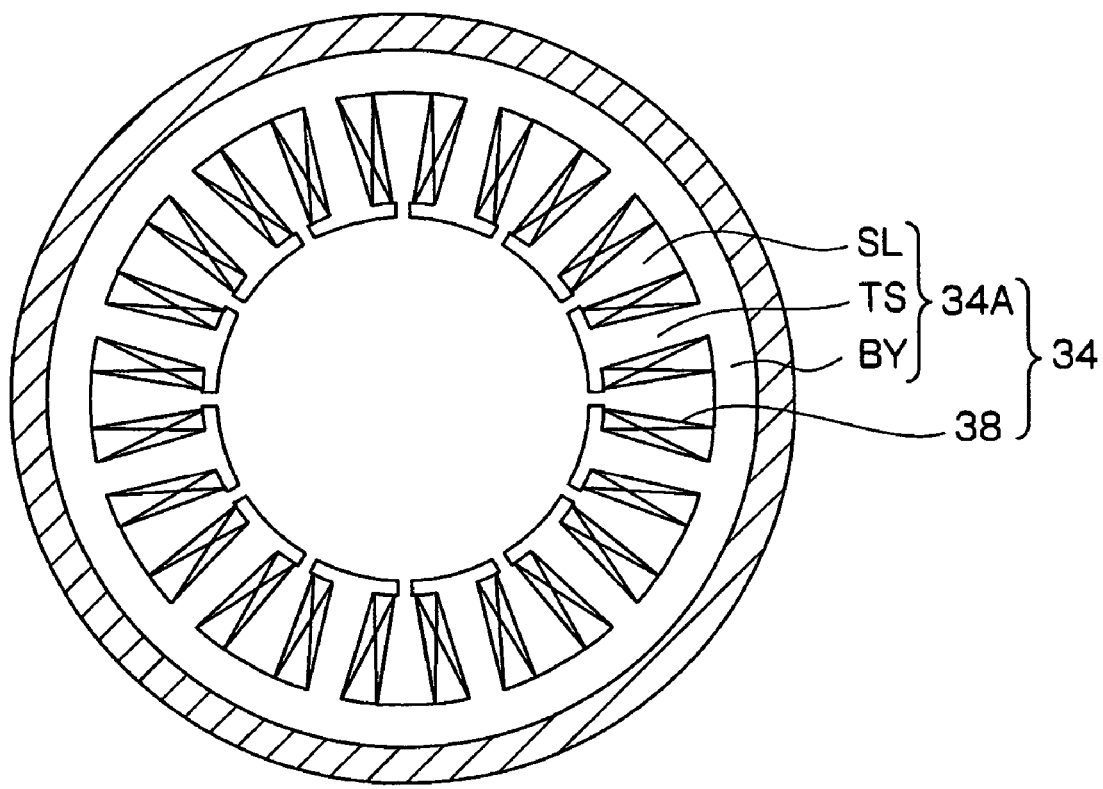
FIG. 6 is a radial sectional view that shows the totally press-fitted configuration employed in conventional brushless motors, in comparison with the partially press-fitted configuration shown in FIGS. 2 and 3.

FIG. 5 illustrates, using the reference numerals in FIG. 2, one example of a conventional brushless motor 16', where the above-mentioned plurality of slots of a stator are not filled with a filling resin. In this case, unlike FIG. 2, a resin material is not injected into the stator slots, which remain empty. Furthermore, FIG. 6 illustrates a (conventional) example where a stator 34 and a motor yoke 21 are formed by a total press-fit method, not by the partial press-fit method as described above, using the reference numerals in FIG. 3. In this case, unlike FIGS. 3 and 4, the stator core 34A is press-fitted into and engages with the motor yoke 21 in a state where the entire outer surface of the stator core 34A is in contact with the entire inner surface of the motor yoke 21

(i.e., there are no concave grooves 50, projections 51, or gap G with depth ΔD as shown in FIG. 4).

Referring back to FIG. 2, the resolver supporting member 20 is a disk-shape member made of a non-magnetic material. The resolver supporting member 20 is positioned at the opening of the motor yoke 21 on its rear side so as to close the opening. The before-described rolling bearing 36 is securely installed in the bearing receptacle formed at the radial center of the resolver supporting member 20. Therefore, one end of the motor output shaft 16A of the rotor 33 is rotatably supported by this bearing 36.

The resolver 19 includes: a rotor (or resolver rotor) 41 securely installed around the circumferential surface of the motor output shaft 16A; and a stator (or resolver stator) 42 placed facing the resolver rotor 41 with a certain space between them.

The rear cover 23 is a circular disk member that has a bent portion 23A formed along its circumference. The bent portion 23A is attached to the outer surface of the flange portion of the resolver supporting member 20 so that the outer edge of the rear cover 23 corresponds to that of the motor yoke 21.

The electric power steering apparatus 1 of this embodiment is structured as described above and is thereby capable of assisting a manual steering force in a steering torque.

Particularly, in the motor stator 34 of this embodiment, each slot SL is filled with resin to form the resin-filled portion M1. Since the resin-filled portion M1 functions integrally with the motor stator 34, it can improve the rigidity of the motor stator 34. Accordingly, even if cogging due to torque loss fluctuation occurs in the brushless motor 16, noise and vibration resulting from that cogging can be suppressed. Furthermore, when the rotation direction of the brushless motor 16 is changed fast by a switching current supplied from an inverter placed in the controller 5, the electromagnetic-force direction is changed fast, which causes coil vibration. However, the vibration can be suppressed or prevented with the improved rigidity of the motor stator 34.

Furthermore, according to this embodiment, the partially press-fitted configuration can provide various features and advantages.

First, since the stator core 34A is caused to engage with the motor yoke 21 by the partial press-fit method, the metal-to-metal contact area between the stator core 34A and the motor yoke 21 becomes smaller, compared to the conventional totally or approximately totally press-fitted and engaged configuration. Thus, vibration occurring between the stator core 34A and the motor yoke 21 is attenuated with certainty, and noise and vibration due to cogging can be further decreased.

Furthermore, the partially press-fitted and engaged configuration can prevent degradation of the magnetic property of the material of the stator core 34A resulting from stress applied to the stator core 34A, occurrence of torque loss, and worsening of torque loss fluctuation.

In addition to the partially press-fitted and engaged configuration, the remaining gap G around the contact portions (between the bottom portions 50A of the concave grooves 50 and the top portions 51A of the projections 51) is filled with resin to form the resin-filled portion M2. So, the rigidity of the resin-filled portion M2 improves, which suppresses the occurrence of vibration, and the resin-filled portion M2 simultaneously functions as a buffer for attenuating transmission of any remaining vibration. Accordingly, the prevention of noise or vibration due to cogging can be further ensured.

Meanwhile, the contact portions between the stator core 34A and the motor yoke 21 for the partial press-fit process are located at the positions (bases of the teeth) opposite and corresponding to the respective teeth TS. Consequently, the shortest flux path possible is formed between each tooth TS and the motor yoke 21, which prevents the magnetic property of the stator 34 from degrading due to the partially press-fitted configuration.

Moreover, the partially press-fitted configuration is formed, using the concave-convex parts (the concave grooves 50 and the projections 51) of the stator core 34A and the motor yoke 21. Furthermore, the gap around the contact portions of the concave-convex parts is also filled with resin to form the resin-filled portion M2. Consequently, the concave-convex engaged configuration and the resin-filled portion M2 function as a rotation-preventing means when a rotational torque is applied to the stator core 34A, whereby it is possible to ensure the prevention of the stator core 34A's displacement in the direction of rotation.

Moreover, because of the above-described partially press-fitted configuration, it is possible to enhance the circularity of the inside surface of the motor yoke 21, compared to the totally press-fitted configuration (see FIG. 6). Because of this characteristic, it is also possible to decrease torque loss fluctuation.

As described above, it is possible to provide an electric power steering apparatus that can achieve a high level of quietness by employing, as a stator's mechanical structure, a structure that can improve anti-vibration and anti-noise properties, and thereby suppress the occurrence of cogging due to torque loss fluctuation of the brushless motor 16 as much as possible, and reduce the transmission of vibration and noise due to such cogging torque. It is also possible to improve the steering sensation.

The electric power steering apparatus according to this invention is not limited to the structure of the above-described embodiment, but can be applied with further variations as necessary within the gist of the invention described in each claim.

For example, the circumferential cross-section of the concave groove 50 formed on the outer surface of the stator core 34A, and the circumferential cross-section of the projection 51 formed on the inner surface of the motor yoke 21 are not necessarily limited to a circular-arc shape as shown in FIGS. 3 and 4, instead the concave-convex shape may be trapezoidal (polygonal).

Furthermore, the above-described embodiment describes a structure where both a partially press-fitted configuration and a resin-filled configuration are employed. However, the electric power steering apparatus of this invention may be structured to employ only one of either the partially press-fitted configuration or the resin-filled configuration.

What is claimed is:

1. An electric power steering apparatus for making an electric motor generate a steering-assist torque in response to a steering torque applied to wheels,
    wherein the electric motor comprises:
        a rotor rotating around an axis of the electric motor; and
        a stator disposed facing the rotor with a certain distance between them in a radial direction of the electric motor;
    wherein the stator includes:
        a back core of approximately cylindrical shape in the axial direction of the electric motor;
        a plurality of teeth disposed along the circumference of the back core protruding from the back core toward its radial center and forming slots therebetween;

an exciting coil wound around each of the plurality of teeth;

a yoke disposed around and in contact with the outer surface of the back core and formed in an approximately cylindrical shape along the axial direction, the back core being partially press-fitted into the yoke so that the outer surface of the back core comes partially into contact with the inner surface of the yoke along their circumferences, the partially press-fitted parts correspond to the positions of the respective teeth around the circumference of the back core, and the partially press-fitted parts are configured in such a way that respective bottom portions of concave parts formed on the outer surface of the back core extending along its axial direction are pressed against and made to come into contact with respective top portions of convex parts formed on the inner surface of the yoke extending along its axial direction; and wherein each of the slots is filled with a resin material after the coil is wound around each of the teeth.

2. The electric power steering apparatus according to claim 1, wherein a gap between the back core and the yoke, around the partially press-fitted parts, is filled with a resin filling material.

3. An electric power steering apparatus for making an electric motor generate a steering-assist torque in response to a steering torque applied to wheels, wherein the electric motor comprises:

a rotor rotating around an axis of the electric motor;

a stator disposed facing the rotor with a certain distance between them in a radial direction of the electric motor; and a yoke of approximately cylindrical shape disposed around the stator;

wherein the stator includes:

a back core of approximately cylindrical shape in the axial direction of the electric motor;

a plurality of teeth disposed along the circumference of the back core protruding from the back core toward its radial center and forming slots therebetween; and an exciting coil wound around each of the plurality of teeth; and wherein the back core is partially press-fitted into the yoke so that the outer surface of the back core comes partially into contact with the inner surface of the yoke along their circumferences, and wherein the partially press-fitted parts correspond to the positions of the respective teeth around the circumference of the back core, and the partially press-fitted parts are configured in such a way that respective bottom portions of concave parts formed on the outer surface of the back core extending along its axial direction are pressed against and made to come into contact with respective top portions of convex parts formed on the inner surface of the yoke extending along its axial direction.

4. The electric power steering apparatus according to claim 3, wherein a gap between the back core and the yoke, around the partially press-fitted parts, is filled with a resin filling material.

\* \* \* \* \*